United States Patent
Takaoka et al.

(10) Patent No.: US 11,286,704 B2
(45) Date of Patent: Mar. 29, 2022

(54) OBJECT MOVING DEVICE

(71) Applicants: HI-LEX CORPORATION, Takarazuka (JP); TOYOTA JIDOSHA KABUSHIKI KAISHA, Toyota (JP)

(72) Inventors: Hiroyuki Takaoka, Hyogo (JP); Tetsuya Nagasaki, Okazaki (JP)

(73) Assignees: HI-LEX CORPORATION, Takarazuka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 16/913,497

(22) Filed: Jun. 26, 2020

(65) Prior Publication Data

US 2020/0408026 A1    Dec. 31, 2020

(30) Foreign Application Priority Data

Jun. 27, 2019  (JP) .............................. JP2019-120116

(51) Int. Cl.
  *E05F 11/48*  (2006.01)
  *E05F 15/689* (2015.01)
  *B60J 1/17*   (2006.01)

(52) U.S. Cl.
  CPC .............. *E05F 15/689* (2015.01); *B60J 1/17* (2013.01); *E05Y 2900/55* (2013.01)

(58) Field of Classification Search
  CPC ..... E05F 15/689; E05F 11/486; E05F 11/385; B60J 1/17; E05Y 2900/55; E05Y 2800/33; E05Y 2800/412; E05Y 2201/684; F16N 1/00
  USPC ......................................................... 49/352
  See application file for complete search history.

(56) References Cited

U.S. PATENT DOCUMENTS

| | | | |
|---|---|---|---|
| 10,753,137 B2* | 8/2020 | Muramatsu | E05F 11/488 |
| 10,822,859 B2* | 11/2020 | Shiroma | E05F 11/486 |
| 2008/0086949 A1 | 4/2008 | Shimura et al. | |
| 2011/0067311 A1* | 3/2011 | Corden | E05F 11/382 49/70 |

(Continued)

FOREIGN PATENT DOCUMENTS

| | | |
|---|---|---|
| DE | 102018213172 A1 | 2/2020 |
| FR | 2813914 A1 | 3/2002 |

(Continued)

OTHER PUBLICATIONS

Nov. 19, 2020 Search Report issued in European Patent Application No. 20181872.1.

*Primary Examiner* — Jerry E Redman
(74) *Attorney, Agent, or Firm* — Oliff PLC

(57) ABSTRACT

A carrier plate is attached to a guide rail so as to move on the guide rail along the extending direction. An erected portion includes a first surface and a second surface which extend in an extending direction. A slit is formed by a first edge portion which is disposed on a side of the first surface of the erected portion and a second edge portion which is disposed on a side of the second surface of the erected portion. A cutout portion which includes an opening facing the erected portion is provided in at least one of the first edge portion and the second edge portion. The cutout portion includes a space portion which allows grease to be stored therein. The grease stored in the cutout portion is applied to the erected portion which slides in the slit when the carrier plate moves on the guide rail.

4 Claims, 5 Drawing Sheets

(56) References Cited

U.S. PATENT DOCUMENTS

| | | | |
|---|---|---|---|
| 2013/0111816 A1* | 5/2013 | Kinoshita | E05F 11/486 49/376 |
| 2019/0040668 A1* | 2/2019 | Muramatsu | E05F 11/483 |
| 2019/0048641 A1* | 2/2019 | Muramatsu | E05F 11/48 |
| 2020/0071981 A1* | 3/2020 | Beadle | C10M 103/06 |
| 2020/0131823 A1* | 4/2020 | Yamamoto | E05F 11/483 |
| 2020/0131834 A1* | 4/2020 | Yamamoto | B60J 1/17 |

FOREIGN PATENT DOCUMENTS

| | | |
|---|---|---|
| JP | S58-181885 U | 12/1983 |
| JP | H07-317432 A | 12/1995 |

\* cited by examiner

OBJECT MOVING DEVICE

CROSS REFERENCE TO RELATED APPLICATIONS

This application is entitled to (or claims) the benefit of Japanese Patent Application No. 2019-120116, filed on Jun. 27, 2019, the disclosure of which including the specification, drawings and abstract is incorporated herein by reference in its entirety.

TECHNICAL FIELD

The present invention relates to an object moving device which moves an object to be held (hereinafter, referred to as "holding object") that a carrier plate holds.

BACKGROUND ART

An object moving device which moves an object such as a window enables the object to perform a predetermined movement by moving a carrier plate with a drive section in a state where the carrier plate holds an object to be moved (hereinafter, referred to as "movement object"). Such an object moving device uses, for guiding the carrier plate in a moving direction, a guide rail to which the carrier plate is fitted in a state where the carrier plate is slidable in the moving direction.

For example, a carrier plate in Patent Literature (hereinafter, referred to as "PTL") 1 is in sliding contact with a rail side wall of a guide rail and is fitted to the guide rail, where the rail side wall extends upright from a rail bottom wall of the guide rail. The carrier plate ensures slidability for movement in an up-down direction by providing a distance between the carrier plate and a locking edge which is bent-formed toward the outside from an end edge of the rail side wall of the guide rail, and a distance between the carrier plate and the rail bottom wall of the guide rail.

CITATION LIST

Patent Literature

PTL 1
Japanese Patent Application Laid-Open No. H07-317432

SUMMARY OF INVENTION

Technical Problem

A window regulator of PTL 1 has a configuration in which a lubricant which is applied to a surface of the rail bottom wall of the guide rail is collected with an elastic leg piece and is supplied to the rail side wall of the guide rail for the purpose of preventing occurrence of a hammering sound at the rail bottom wall and/or the locking edge by suddenly opening and closing a door or the like. However, the window regulator of PTL 1 requires a large amount of lubricant to be applied before sliding movement of the carrier plate. Further, application of lubricant to a surface of the rail side wall can only be performed on a side of the surface of the rail bottom wall, and it is difficult to perform the application of lubricant over an erection direction of the surface of the rail side wall.

Further, the carrier plate is desirably fitted to the guide rail without rattling, and thus, a movement object such as a window glass does not oscillate. Accordingly, a distance between the surface of the rail side wall of the guide rail and a portion of the carrier plate, which sandwiches the surface of the rail side wall, is narrow. Thus, there is concern that the carrier plate may be worn by movement of the carrier plate for the application of lubricant to the surface of the rail side wall with the elastic leg piece.

An object of the present invention is to provide an object moving device capable of moving a carrier plate smoothly with a lubricant.

Solution to Problem

To achieve the object, the object moving device of the present invention includes:

a guide rail including a base portion which extends in a predetermined direction, and an erected portion which is erected on the base portion along an extending direction of the base portion; and a carrier plate including a main body portion which holds a holding object, and a slit which houses the erected portion, wherein the carrier plate is attached to the guide rail so as to move on the guide rail along the extending direction, the erected portion includes a first surface and a second surface which extend in the extending direction, the slit is formed by a first edge portion which is disposed on a side of the first surface of the erected portion and a second edge portion which is disposed on a side of the second surface of the erected portion, a cutout portion which includes an opening facing the erected portion is provided in at least one of the first edge portion and the second edge portion, the cutout portion includes a space portion which allows grease to be stored therein, and the grease stored in the cutout portion is applied to the erected portion which slides in the slit when the carrier plate moves on the guide rail.

Advantageous Effects of Invention

According to the present invention, a holding object which a carrier plate holds can be moved efficiently and smoothly when moving the holding object.

DESCRIPTION OF EMBODIMENTS

Hereinafter, an embodiment of the present invention will be described in detail with reference to the drawings.

[Overall Configuration of Object Moving Device]

An object moving device is a device which moves a holding object which a carrier plate holds by movement of the carrier plate on a guide rail. For example, the object moving device is a device which moves the carrier plate by transmitting a driving force of a drive section to the carrier plate via a cable. The holding object of the object moving device is an object which the carrier plate holds, and may be an object which is provided integrally with the carrier plate or may be an object which is a separate body from the object moving device and which is connected to the object moving device.

The object moving device can be used in a window glass-lifting and lowering device in which the holding object which the carrier plate holds is a window glass, or in other devices. The other devices to which the object moving device may be applied include, for example, a device which lifts and lowers a metal plate or a plate made of a resin. Further, the other devices to which the object moving device can be applied also include, for example, a walking assisting device which assists a pedestrian in walking by lifting and lowering a handle that the pedestrian holds.

Figure 1:
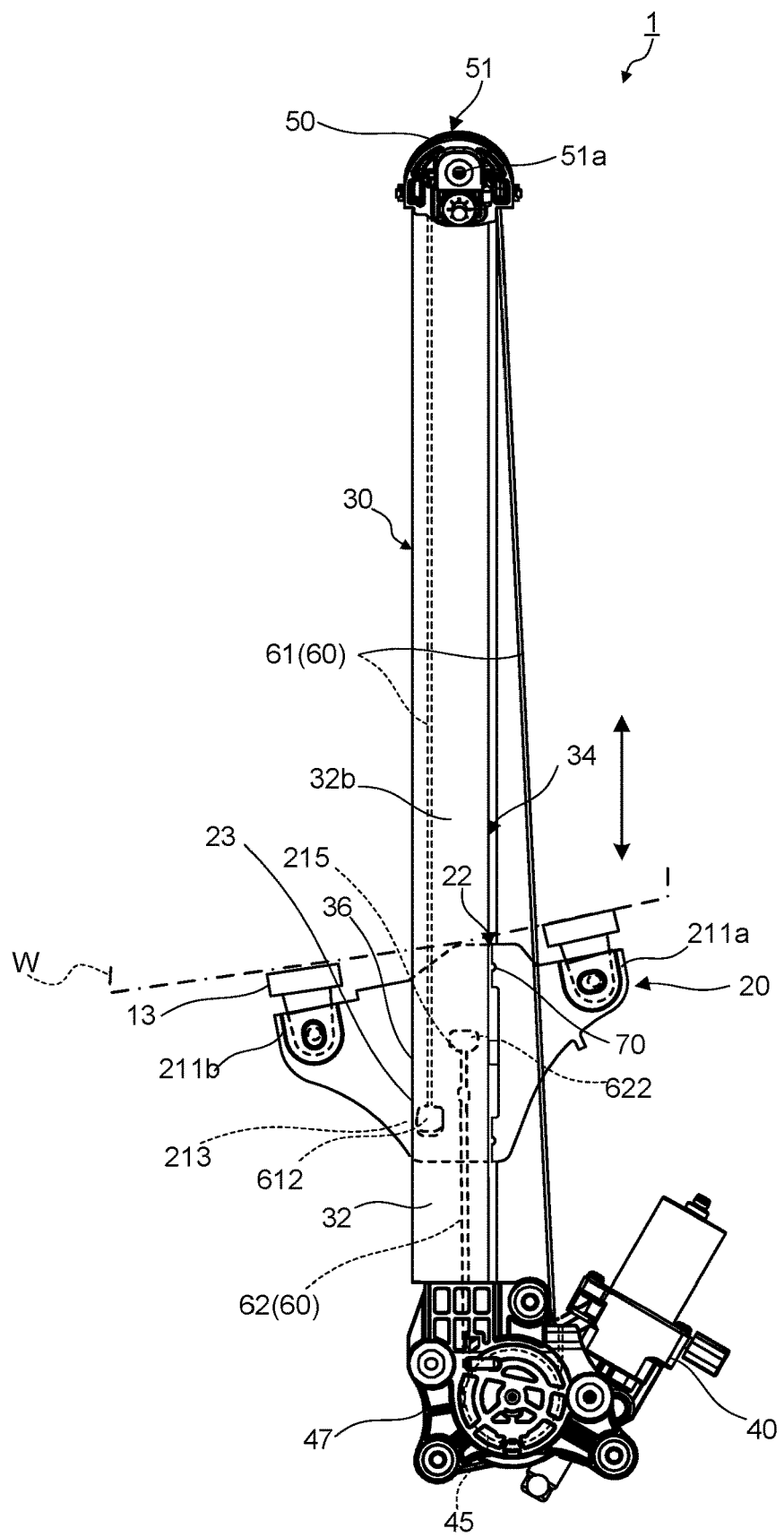
FIG. 1 is an overall view of an object moving device according to an embodiment of the present invention.

For example, object moving device 1 illustrated in FIG. 1 is fixed between an inner panel and an outer panel of a door of a vehicle and is applied to a window regulator or the like which lifts and lowers a window of the door (for example, window glass). Note that, the present embodiment will be described, unless otherwise noted, such that a longitudinal direction of guide rail 30 is referred to as up-down direction, and that a direction which is parallel to the window glass that is holding object W supported by object moving device 1, and which is perpendicular to the up-down direction is referred to as left-right direction. In a case where the application example is a window regulator, a moving direction of carrier plate 20 is the up-down direction since the window regulator lifts and lowers the window glass.

In addition to carrier plate 20 which holds the window glass as holding object W and guide rail 30, object moving device 1 includes, as a mechanism which moves carrier plate 20, direction-changing section 50, cable 60, drive section 40, and drum member 45.

A driving force of drive section 40 is transmitted to carrier plate 20 via cable 60. Carrier plate 20 is configured to be movable on guide rail 30 by driving of drive section 40.

[Drive Section 40]

Drive section 40 is connected to drum member 45. Drive section 40 rotates drum member 45 by driving such as driving by a power supply. Drum member 45 which rotates by drive section 40 winds and unwinds cable 60.

Drive section 40 includes, for example, a motor which drives by turning on and off a power supply, and rotates drum member 45 which is connected to drive section 40. Drive section 40 is housed in a motor housing and is fixed to a target to be attached (hereinafter, referred to as "attachment target"), such as a base or a vehicle body, via the motor housing. In the present embodiment, the motor housing is fixed to drum housing 47. In the present embodiment, drive section 40 is disposed at a lower end portion of guide rail 30.

Drive section 40 of the present embodiment is a motor which electrically drives by a current supplied from a battery. Note that, the motor and drum member 45 transmit rotational motion of the motor to drum member 45 via a power transmission section, such as a worm gear, for example. The motor which is drive section 40 rotationally drives in a forward direction and a backward direction, and thereby drum 45 rotates in the forward direction and the backward direction.

[Drum Member 45]

Drum member 45 is connected to drive section 40, and cable 60 is wound around drum member 45. A terminal member (cable end) of cable 60 is fixed to drum member 45, and drum member 45 winds and unwinds cable 60. In the present embodiment, drum member 45 includes a locking portion (not illustrated) which houses the terminal member (cable end) of cable 60, and is rotatably housed in drum housing 47. Drum member 45 is connected to carrier plate 20 via cable 60. Drum member 45 is made of, for example, a resin and/or the like.

In the present embodiment, one of cable ends of lifting cable 61 and one of cable ends of lowering cable 62, in which lifting cable 61 and lowering cable 62 are cable 60, are connected to drum member 45, respectively. Drum member 45 winds and unwinds lifting cable 61 and lowering cable 62 by the rotation of drum member 45 in the forward direction and the backward direction. Lifting cable 61 and lowering cable 62 are wound and unwound by the rotation of drum member 45, and thus, carrier plate 20 is moved.

In drum member 45 of the present embodiment, lifting cable 61 and lowering cable 62 are wound in directions opposite to each other. Drum member 45 of the present embodiment is connected to both lifting cable 61 and lowering cable 62 at the lower end portion of guide rail 30. Drum member 45 rotates in one direction to wind lifting cable 61 and unwind lowering cable 62, and thereby carrier plate 20 is moved upwardly. Further, drum member 45 rotates in the other direction to unwind lifting cable 61 and wind lowering cable 62, and thereby carrier plate 20 is moved downwardly.

Drum housing 47 is made of a resin, for example, and rotatably houses drum member 45. In the present embodiment, drive section 40 is fixed to drum housing 47, and the lower end portion of guide rail 30 is connected to drum housing 47. However, drum housing 47 may be provided at an intermediate position in the up-down direction of guide rail 30 or may be provided apart from guide rail 30 as long as drum housing 47 houses drum member 45.

Note that, although the present embodiment employs a configuration in which drive section 40 and drum member 45 are disposed on a side of the lower end portion of guide rail 30, the present invention is not limited to this configuration. Drive section 40 and drum member 45 may be disposed at any position and cable 60 may be routed in any manner as long as carrier plate 20 can be lifted and lowered via cable 60. For example, the following configuration may be employed. Drum member 45 which rotates by drive section 40 is provided at a height position of an intermediate portion in the longitudinal direction of guide rail 30, and a direction-changing member such as a cable guide is provided at the lower end portion of guide rail 30. In addition, lowering cable 62 is wound around the direction-changing member and is placed between drum member 45 and carrier plate 20, and carrier plate 20 is lifted and lowered via cable 60 which is wound to and unwound from drum member 45.

[Direction-Changing Section 50]

Direction-changing section 50 changes a moving direction of cable 60 (specifically, lifting cable 61) on guide rail 30. Lifting cable 61 is wound around direction-changing section 50, and direction-changing section 50 changes the moving direction of lifting cable 61. Direction-changing section 50 is provided with fixing portion 51 which is fixed to guide rail 30.

Direction-changing section 50 is made of, for example, a resin, and is connected to an upper end of guide rail 30. Fixing portion 51 is provided with fastening portion 51a which is fastened to the attachment target such as a vehicle door by a fastening member (not illustrated) such as a bolt. Fastening portion 51*a* is provided with e.g. an insertion hole through which the fastening member is inserted. Fastening portion 51 is fastened to e.g. an inner panel or an outer panel of the vehicle door, and thereby direction-changing section 50 is fixed to the vehicle door.

As direction-changing section 50, for example, a resin-made guide which guides lifting cable 61 along a changing direction, a rotatable pulley or the like is used. In the present embodiment, direction-changing section 50 is a resin-made guide groove which is provided in a circular arc shape. Lifting cable 61 slides on direction-changing section 50, and thus, the moving direction of lifting cable 61 is changed. The moving direction of lifting cable 61 is changed by direction-changing section 50 from a pulling-downward direction on one end side (a side of drum member 45) to a pulling-upward direction on the other end side (a side of carrier plate 20).

<Cable 60>

Cable 60 is a member which moves carrier plate 20 in the up-down direction indicated by an arrow in FIG. 1.

One end of cable 60 is connected to carrier plate 20, and the other end of cable 60 is connected to drum member 45. Cable 60 is wound and unwound by the rotation of drum member 45. Cable 60 transmits the driving force of drive section 40 to carrier plate 20. Cable 60 is locked to drum member 45 and carrier plate 20 at the terminal members of both ends of cable 60, respectively. In the locking structure thereof, the terminal members of cable 60 are locked to a terminal member engagement portion which is provided in drum member 45, and to a terminal member engagement portion which is provided in carrier plate 20, respectively, and thus, cable 60 can be locked to drum member 45 and carrier plate 20 so as to enable a predetermined tension to be applied to cable 60.

In the present embodiment, cable 60 includes lifting cable 61 and lowering cable 62. One end of lifting cable 61 is connected to drum member 45, an intermediate portion located between both ends of cable 60 is wound on direction-changing section 50, and the other end (terminal member 612) of lifting cable 61 is connected to carrier plate 20. Lifting cable 61 pulls up carrier plate 20 by the rotation of drum member 45 in a direction of winding lifting cable 61.

One end of lowering cable 62 is connected to drum member 45, and the other end (terminal member 622) of lowering cable 62 is connected to carrier plate 20. Lowering cable 62 is pulled by the rotation of drum member 45 in a direction of winding lowering cable 62, and thus, carrier plate 20 is pulled down.

<Guide Rail 30>

Guide rail 30 guides movement of carrier plate 20 in a lifting and lowering direction of holding object W. Guide rail 30 is a rail which has substantially the same shaped cross section which extends in the longitudinal direction, and supports carrier plate 20 such that carrier plate 20 is movable along a lifting and lowering path. In the present embodiment, guide rail 30 is provided on a door of a vehicle correspondingly to a lifting and lowering track of holding object W. For example, guide rail 30 may be attached to the door of the vehicle with guide rail 30 being inclined to a rear side of the vehicle with respect to a vertical direction of the vehicle, or with guide rail 30 being curved in a width direction of the vehicle.

Guide rail 30 includes base portion 32 which extends between one end and the other end, and first erected portion (erected portion) 34 and second erected portion 36 which are erected from base portion 32 along an extending direction of base portion 32.

Base portion 32 has a curved flat-plate shape, corresponds to a bottom surface portion of guide rail 30 which is recessed, and supports first erected portion 34 and second erected portion 36. The predetermined direction in which base portion 32 extends is the moving direction of carrier plate 20, and is the lifting and lowering direction of holding object W in the present embodiment.

First erected portion 34 is provided in one side edge portion along the extending direction of base portion 32. First erected portion 34 is provided in a direction which is substantially perpendicular to base portion 32. Second erected portion 36 is provided on the other side edge which extends along the extending direction of base portion 32 so as to face first erected portion 34.

Guide rail 30 is formed in a recessed groove shape with a recessed cross section extending in the longitudinal direction with first erected portion 34, second erected portion 36, and base portion 32 as a bottom portion. Carrier plate 20 is slidably fitted to guide rail 30 on a side of an opening of guide rail 30 which is recessed.

In the present embodiment, first erected portion 34 and second erected portion 36 are erected in edge portions on both sides of base portion 32, respectively, and also function as guide portions which extend in the extending direction of base portion 32.

First erected portion 34 includes first surface 342 and second surface 344 which extend in the extending direction of base portion 32.

First erected portion 34 includes first surface 342 on a side facing outward in a width direction of guide rail 30, and second surface 344 on the rear side thereof. Second surface 344 is located in the inside of the width direction of guide rail 30, where the inside faces second erected portion 36. First surface 342 and second surface 344 of the present embodiment constitutes front and rear surfaces of first erected portion 34 which has a plate shape, and are configured to be capable of guiding carrier plate 20. First erected portion 34 restrains carrier plate 20 from rotating in directions including a width direction of base portion 32 (a direction perpendicular to both of a length direction and a thickness direction of base portion 32). In the present embodiment, first erected portion 34 is fitted to carrier plate 20, and thereby first erected portion 34 together with second erected portion 36 restrain carrier plate 20 from rotating in the width direction of base portion 32.

At a leading end portion in an erection direction of first erected portion 34, first erected portion 34 includes leading end side portion 35 which protrudes in a direction crossing the erection direction, and which extends along first erected portion 34.

In first erected portion 34, leading end side portion 35 is formed to have a rib shape. In the present embodiment, leading end side portion 35 is formed so as to be parallel to an arrangement surface of base portion 32. Leading end side portion 35 is provided to extend in an extending direction of guide rail 30.

<Holding Object W>

Holding object W is connected to carrier plate 20, and is lifted and lowered by the movement of carrier plate 20 to open and close a predetermined opening portion (for example, a window). Holding object W switches between a covered state and an opened state of the opening portion.

In the present embodiment, holding object W is a window glass. Note that, the window glass may slide with a door sash which defines the opening portion (not illustrated), and movement of the window glass may be prevented by the door sash.

Holding object W sets the opening portion in the covered state by guidance of carrier plate 20 to a position on a side of the upper end of guide rail 30, and sets the opening portion in the opened state in accordance with guidance of carrier plate 20 from the position on the side of the upper end of guide rail 30 to a position on a side of a lower end of guide rail 30.

Holding object W in the present embodiment is moved by the movement of carrier plate 20 which moves by winding and unwinding cable 60. Although the window glass is adopted as holding object W, holding object W may be a plate which is formed by a metal, a resin and/or the like other than glass.

[Carrier Plate 20]

Figure 2:
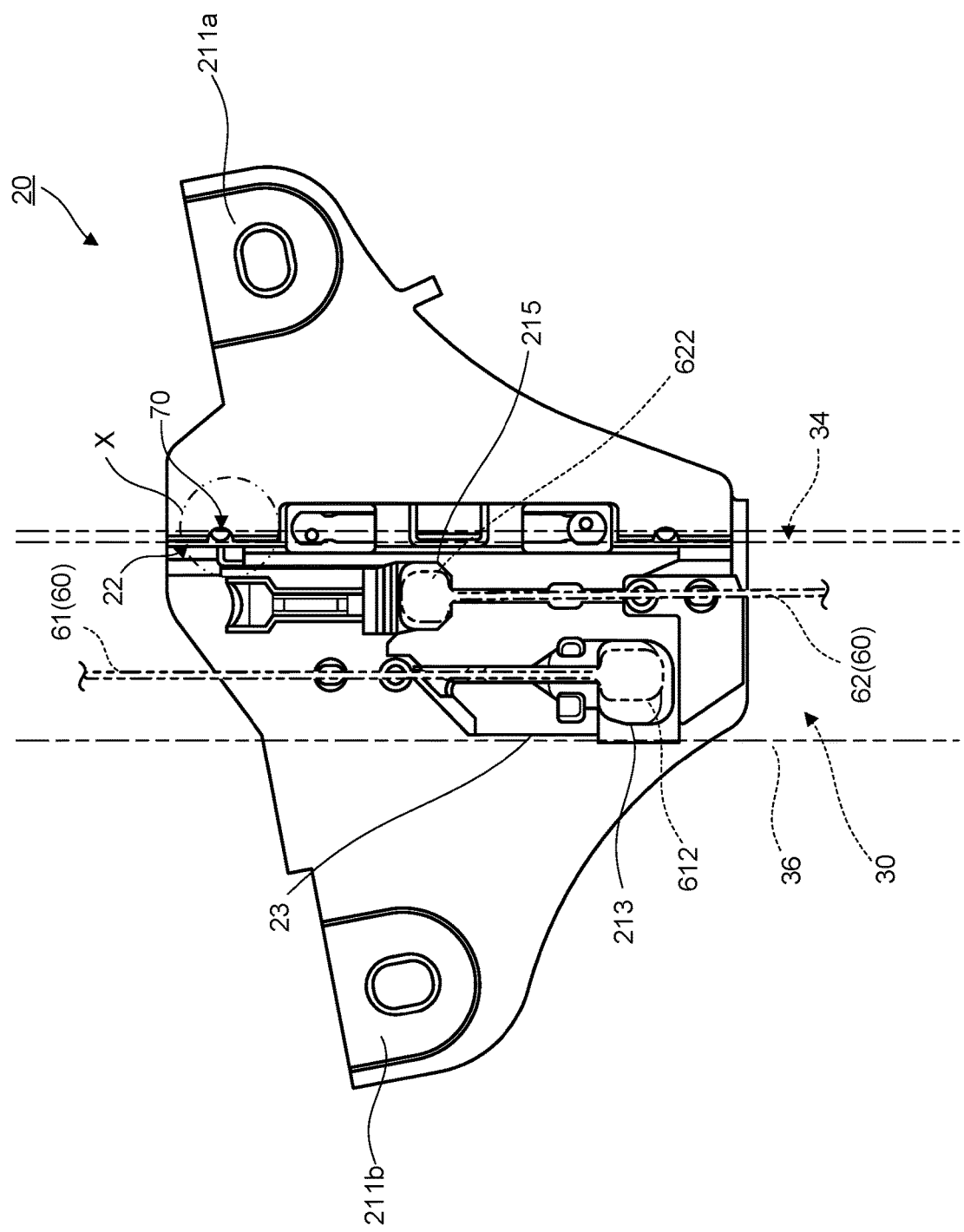
FIG. 2 is a rear view of a carrier plate of the object moving device according to the embodiment of the present invention.
Figure 3:
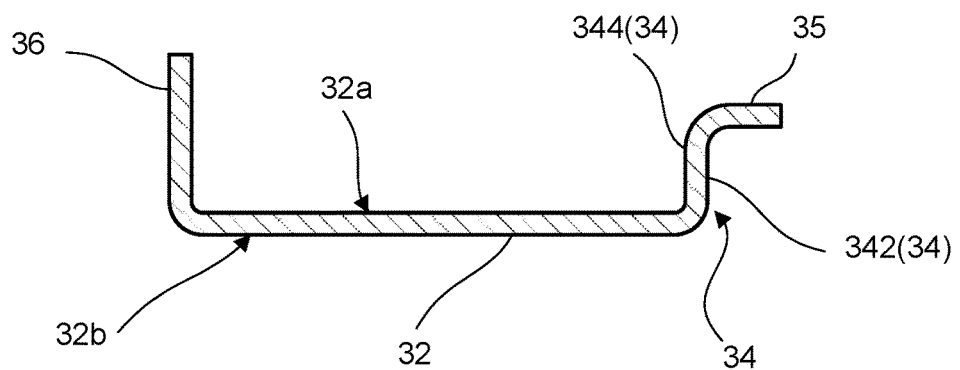
FIG. 3 is a cross-sectional view of a guide rail.

Carrier plate 20 which is illustrated in FIG. 1 and FIG. 2 holds holding object W, and the movement of carrier plate 20 is guided by guide rail 30.

Carrier plate 20 is attached to guide rail 30 so as to move on guide rail 30 along the extending direction of base portion 32.

Carrier plate 20 holds holding object W which is connected to carrier plate 20 via glass holder 13. Carrier plate 20 is moved by guide rail 30 to one side, that is, an upper side of the moving direction of carrier plate 20. Carrier plate 20 moves to a position which is defined as an upper limit end of the movement to the one side of carrier plate 20, that is, a position which causes a state where the window is completely covered and tightly closed (or a closed state of the opening portion) with holding object W. Further, carrier plate 20 moves to the other side, that is, a lower side of the moving direction of carrier plate 20. Carrier plate 20 moves to a position which is defined as a lower limit position of the movement to the other side of carrier plate 20, for example, a position where the window is set to a fully opened state by the movement of the window glass which is holding object W. In the present embodiment, these positions to be set on the one side and the other side of the moving direction of carrier plate 20 are the positions on the side of the upper end and on the side of the lower end of guide rail 30 which extends in the up-down direction.

Carrier plate 20 moves on guide rail 30 by the driving of drive section 40, and stops moving by stopping of drive section 40. Cable 60 which is unwound from drum member 45 by the driving of drive section 40 is connected to carrier plate 20 such that carrier plate 20 can move on guide rail 30 by movement of cable 60.

In the present embodiment, carrier plate 20 is fitted to guide rail 30, and thereby carrier plate 20 is provided to be slidable on guide rail 30 in the up-down direction in a state where the movement of carrier plate 20 in the left-right direction is regulated by the erected portion of guide rail 30.

Carrier plate 20 includes main body portion 21 which holds holding object W, and slit 22 which houses first erected portion 34.

Main body portion 21 is, for example, a plate-like body which has a predetermined thickness. Main body portion 21 is provided with attachment portions 211a and 211b to which the glass holders are attached, and end housing portions 213 and 215. Attachment portions 211a and 211b, and end housing portions 213 and 215 may be directly or indirectly provided in main body portion 21.

Main body portion 21 includes slit 22 which houses first erected portion 34. Slit 22 houses first erected portion 34 of guide rail 30, and thus, carrier plate 20 is freely movably guided by first erected portion 34 in an extending direction of first erected portion 34. In the present embodiment, slit 22 is provided extending along the moving direction of carrier plate 20 on a surface on a guide-rail-side of carrier plate 20 as illustrated in FIG. 1 or FIG. 2. Slit 22 may be configured in any way as long as carrier plate 20 is guided in the extending direction of guide rail 30 with first erected portion 34 which is inserted into slit 22 and which is housed by slit 22. Main body portion 21 has a thickness from a surface on a side thereof opposite to a side thereof, to which the guide rail is attached, to the guide-rail-side thereof, in which the thickness is larger than an erection height of first erected portion 34. Slit 22 is provided over the up-down direction in a protrusion portion of slit 22, and has a depth in a thickness direction of the protrusion portion. Slit 22 has a substantially L-shape in a cross section of carrier plate 20.

Attachment portions 211a and 211b are portions to each of which glass holder 13 is attached, and are provided in an upper end portion of main body portion 21. Glass holder 13 which is connected to holding object W is attached to each of attachment portions 211a and 211b. In the present embodiment, each of attachment portions 211a and 211b includes an attachment hole which opens in a thickness direction of main body portion 21. Glass holder 13 is attached to each of attachment portions 211a and 211b via the fastening member, such as a screw and a bolt, which is inserted into each of the attachment holes (see FIG. 1).

In the upper end portion of main body portion 21, attachment portions 211a and 211b are disposed so as to be apart from each other at a predetermined distance in the width direction of guide rail 30. In the present embodiment, attachment portions 211a and 211b are provided in both side end portions of the upper end portion, respectively, in which the both side end portions are apart from each other in the width direction. Each of end housing portions 213 and 215 houses an end portion which is the terminal member of cable 60, and connects cable 60 (61, 62) to carrier plate 20.

The end housing portion (213, 215) includes end housing portion 213 which houses terminal member 612 of lifting cable 61 for lifting carrier plate 20, and end housing portion 215 which houses terminal member 622 of lowering cable 62 for lowering carrier plate 20.

Lifting cable 61 and lowering cable 62 are led out from respective end housing portions 213 and 215 of carrier plate 20 such that a lead-out portion of each of lifting cable 61 and lowering cable 62 serves as a supporting point for lifting or lowering carrier plate 20.

Slit 22 houses first erected portion 34 of guide rail 30. Slit 22 is formed by one side portion which includes first edge portion 26 and the other side portion which includes second edge portion 27. The one side portion which includes first edge portion 26 includes a leading end side portion-housing portion which houses leading end side portion 35 and which is connected to a bottom side of slit 22. Slit 22 is formed by first edge portion 26 which is disposed on a side of the first surface, and second edge portion 27 which is disposed on a side of the second surface. In the present embodiment, first edge portion 26 and second edge portion 27 include abutting surfaces which abut on first surface 342 and second surface 344, respectively. In slit 22, carrier plate 20 is guided by first erected portion 34 and is freely movable in the extending direction of first erected portion 34. In the present embodiment, slit 22 is provided extending along the moving direction of carrier plate 20 on a rear surface of carrier plate 20 as illustrated in the figures.

Note that, in carrier plate 20, slit 22 is freely slidably fitted to first erected portion 34 of guide rail 30 on a side of the rear surface of main body portion 21, and engagement projection portion 23 engages with second erected portion 36 of guide rail 30. Thus, carrier plate 20 is provided to be slidable on guide rail 30 in the up-down direction in a state where the movement of carrier plate 20 in the left-right direction is regulated by guide rail 30.

Slit 22 is formed by first edge portion 26 which is disposed on the side of first surface 342 of first erected portion 34, and second edge portion 27 which is disposed on the side of second surface 344 of first erected portion 34.

In the present embodiment, slit 22 opens on the surface on the guide-rail-side of carrier plate 20, has a depth in a thickness direction of carrier plate 20, and is formed by first edge portion 26 and second edge portion 27 which are disposed to face each other.

First edge portion 26 includes first sliding surface 262 which faces first surface 342 of first erected portion 34. Second edge portion 27 includes second sliding surface 272 which faces second surface 344 of first erected portion 34.

First sliding surface 262 is a surface which is slidable with first surface 342 of first erected portion 34. Second sliding surface 272 is a surface which is slidable with second surface 344 of first erected portion 34.

First sliding surface 262 and second sliding surface 272 have a distance from first surface 342 and second surface 344 of first erected portion 34, in which the distance which causes first sliding surface 262 and second sliding surface 272 to abut on first surface 342 and second surface 344, or the distance which restrains carrier plate 20 from rotating in a direction which is perpendicular to an axis of guide rail 30.

Thus, carrier plate 20 can smoothly move along the axial direction, that is, the longitudinal direction of guide rail 30 without rotating in the direction perpendicular to the axis of guide rail 30.

Carrier plate 20 may include, on first sliding surface 262, protrusion portion 266 which protrudes to the side of first surface 342.

When carrier plate 20 moves on guide rail 30, protrusion portion 266 of first sliding surface 262 slides with first surface 342. Thus, when carrier plate 20 slides with guide rail 30 at slit 22 and first erected portion 34, carrier plate 20 can slide with guide rail 30 while coming into point contact with each other, and the sliding can be smoothly performed with reduced friction.

In carrier plate 20, cutout portion 70 is provided in at least one of first edge portion 26 and second edge portion 27. In the present embodiment, cutout portion 70 is provided in first edge portion 26 so as to be recessed in a direction away from second edge portion 27. Cutout portion 70 includes opening 72 which faces first erected portion 34.

Cutout portion 70 forms space portion 74, and can store grease G in a semisolid state between carrier plate 20 and first erected portion 34. Cutout portion 70 may be formed in any way as long as cutout portion 70 includes a wall surface capable of forming space portion 74 and can store grease G.

In the present embodiment, cutout portion 70 is provided on one side of the erection direction of first erected portion 34 when carrier plate 20 is attached to guide rail 30.

In the present embodiment, cutout portion 70 opens on the guide-rail-side of carrier plate 20. Cutout portion 70 is provided in first erected portion 34 in the present embodiment, but may be provided in second erected portion 36 or may be provided in both first erected portion 34 and second erected portion 36.

On a side of carrier plate 20 opposite to the guide rail, hole portion 217 through which the grease can be injected at a position corresponding to cutout portion 70 provided on the guide-rail-side of carrier plate 20 is provided. Cutout portion 70 is in communication with hole portion 217 which is provided in main body portion 21.

Hole portion 217 and cutout portion 70 are provided at a position which enables grease G to reach cutout portion 70 when grease G is injected into hole portion 217 in a state where carrier plate 20 is attached to guide rail 30.

Figure 4:
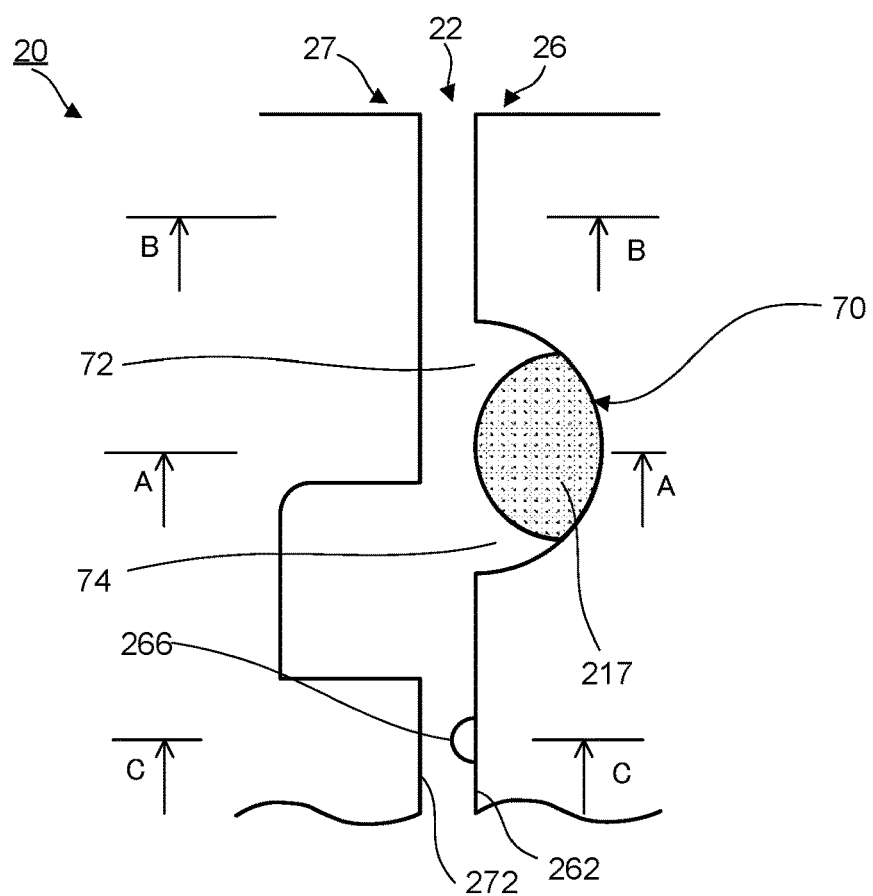
FIG. 4 is an enlarged view of a portion X which indicates a cutout portion in FIG. 2.
Figure 5:
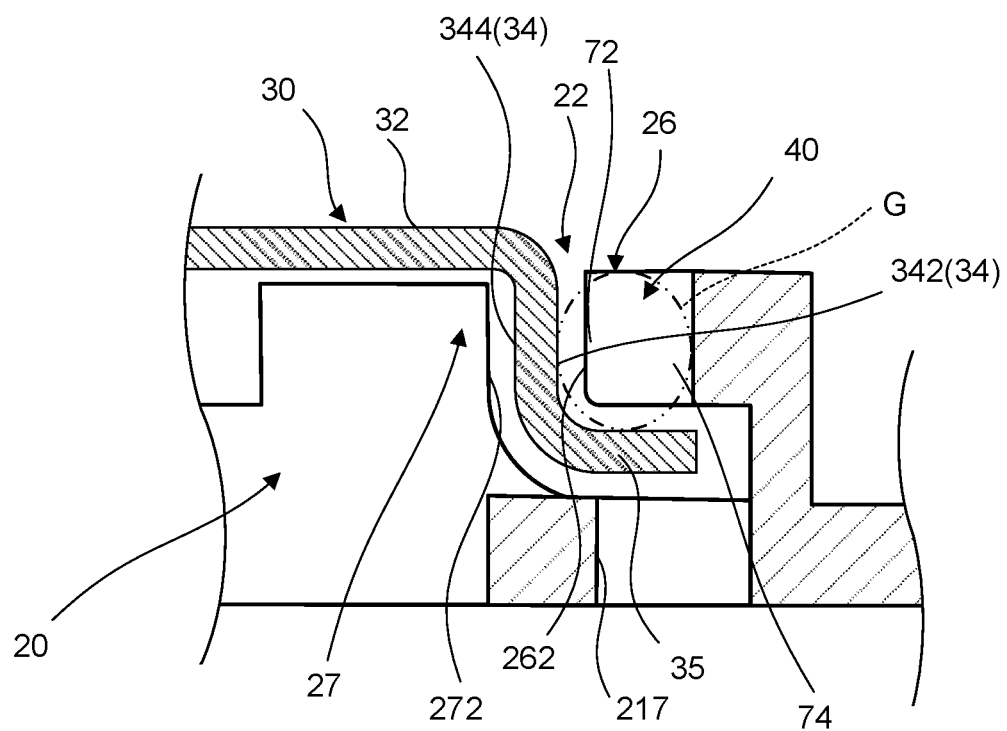
FIG. 5 is a partial cross-sectional view taken along line A-A of FIG. 4.
Figure 6:
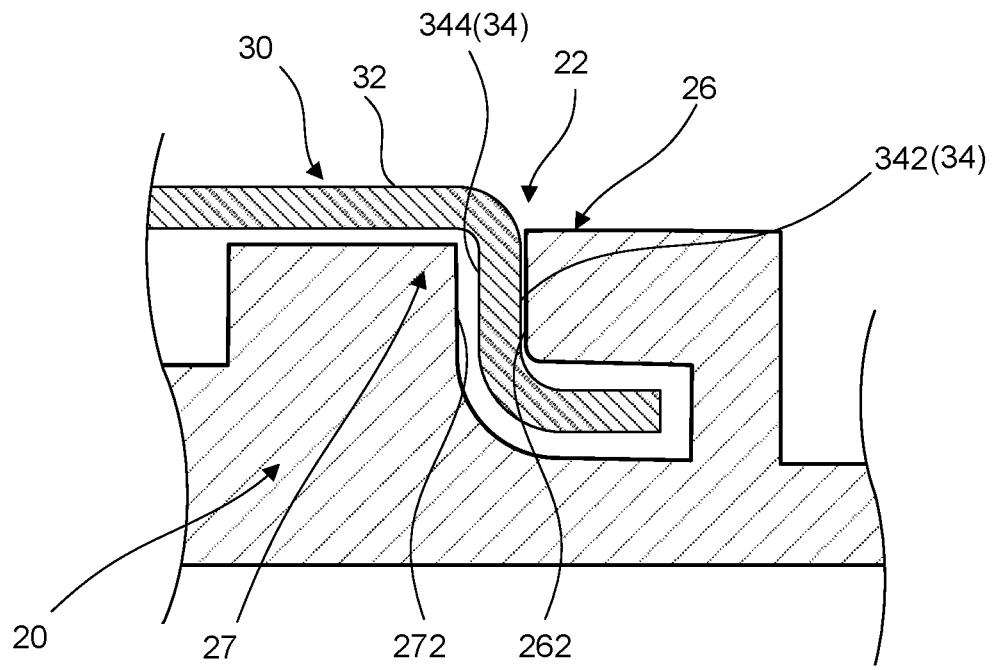
FIG. 6 is a partial cross-sectional view taken along line B-B of FIG. 4.
Figure 7:
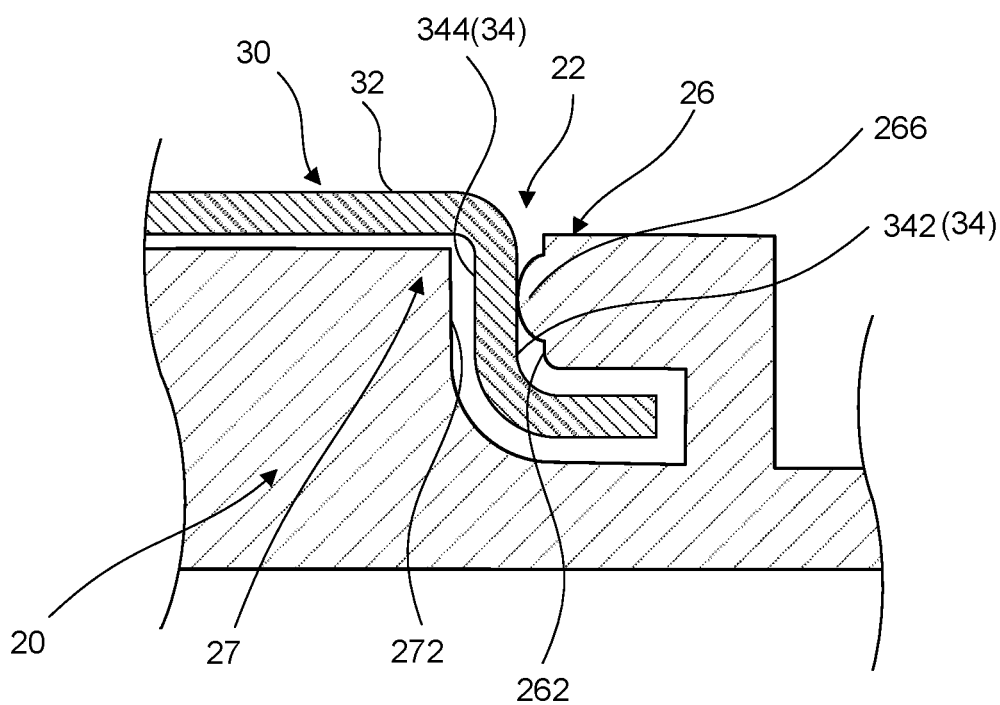
FIG. 7 is a partial cross-sectional view taken along line C-C of FIG. 4.
Figure 8:
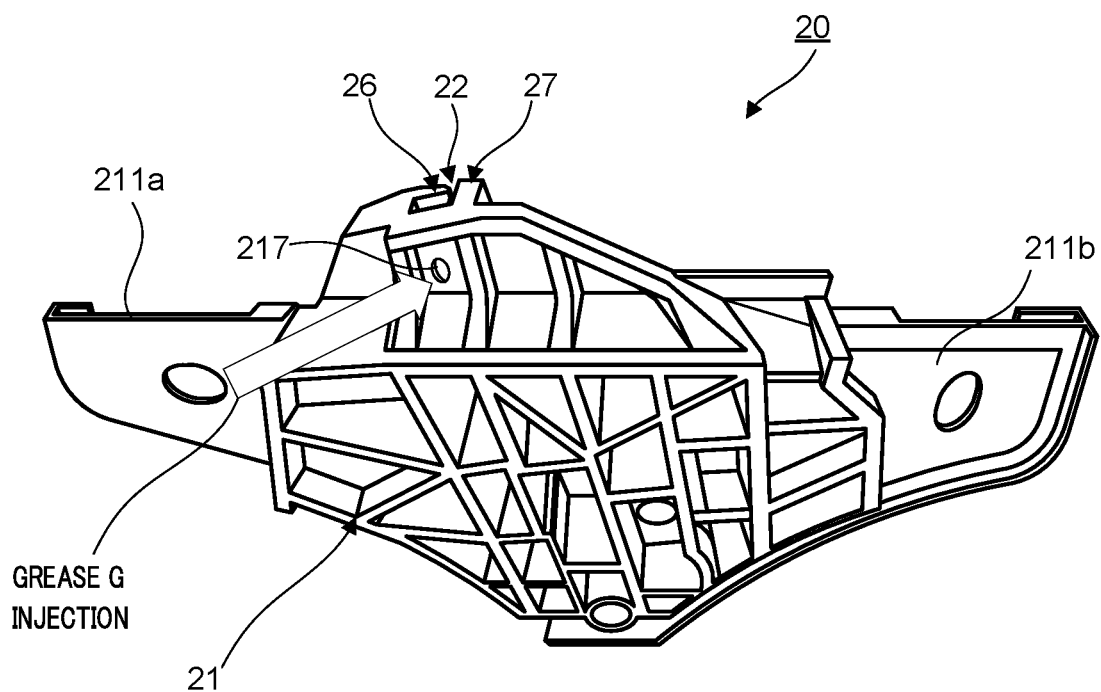
FIG. 8 is a front side perspective view of the carrier plate of the object moving device according to the embodiment of the present invention.

Thus, when filling grease G into cutout portion 70 which is provided on a side of the rear surface of carrier plate 20, grease G can be easily filled into cutout portion 70 through hole portion 217 from a side of a front surface of object moving device 1 without exposing a side of a rear surface of object moving device 1 even in the state where carrier plate 20 is attached to guide rail 30. In FIG. 4, a portion of carrier plate 20, which penetrates through from cutout portion 70 to hole portion 217, is displayed with dots for convenience.

Opening 72 causes first erected portion 34 to face the interior of cutout portion 70, and space portion 74 in the interior is disposed adjacent to first erected portion 34.

Space portion 74 is interposed between erected portion 34 and carrier plate 20, and thereby to store grease G which reduces friction and which makes the sliding smooth. Space portion 74 is a space which has a depth along the erection direction of the erected portion.

Space portion 74 has a size capable of storing an amount of grease G which adheres to first erected portion 34 and which is spread and applied from space portion 74 even when first erected portion 34 is reciprocated a predetermined number of times.

When carrier plate 20 moves on guide rail 30, grease G stored in space portion 74 of cutout portion 70 is applied to first erected portion 34 which slides in slit 22.

[Operation and Effects of Object Moving Device 1]

In object moving device 1 illustrated in FIG. 1, first erected portion 34 erected on base portion 32 in guide rail 30 is housed in slit 22 of carrier plate 20 which holds the holding object. Carrier plate 20 is attached to guide rail 30 so as to move on guide rail 30 along the extending direction of base portion 32.

Slit 22 is formed by first edge portion 26 which is disposed on the side of first surface 342 extending in the extending direction of first erected portion 34, and second edge portion 27 which is disposed on the side of second surface 344 extending in the extending direction of first erected portion 34. Cutout portion 70 which includes opening 72 facing first erected portion 34 is provided in at least one of first edge portion 26 and second edge portion 27. Cutout portion 70 includes space portion 74 in which storing grease G can be stored.

With the above configuration, first erected portion 34 moves in slit 22 when carrier plate 20 moves on guide rail 30. In this case, space portion 74 of cutout portion 70 moves relative to first erected portion 34 along first erected portion 34. Grease G stored in cutout portion 70 adheres to a portion of first erected portion 34 which faces space portion 74. Grease G is applied to at least first surface 342 of first erected portion 34. Grease G is also applied to first edge portion 26 of slit 22 (first sliding surface 262) with which first surface 342 slides. Further, grease G which adheres to first erected portion 34 moves following the sliding in slit 22 of first erected portion 34, and grease G in space portion 74 also moves following the sliding. With this movement, grease G is spread over the sliding portion of both.

Further, since grease G is injected through hole portion 217, grease G is filled into the leading end side portion-housing portion which houses leading end side portion 35, and is filled into slit 22 as well. Accordingly, grease G is applied not only to first surface 342 of first erected portion 34, but also to one surface or the other surface of leading end side portion 35 which is continuous to first surface 342, to second surface 344 which is continuous to the aforementioned other surface, or the like, and thus, grease G is applied to first erected portion 34 in its entirety located in slit 22.

Thus, grease G can be efficiently applied to the sliding portion between carrier plate 20 and guide rail 30, and relative movement by carrier plate 20 and guide rail 30, specifically, movement of carrier plate 20 with respect to guide rail 30 can be smoothly performed. Further, grease G can be easily injected into space portion 74 of cutout portion 70 through hole portion 217 from a side of carrier plate 20 which is opposite to guide rail 30, that is, from a front side of carrier plate 20, and grease application work can also be easily performed. Accordingly, wear due to first erected portion 34 of the guide rail is restrained in the object moving device which uses carrier plate 20.

The embodiment of the present invention has been described thus far. Note that, the above description is only illustration of a preferred embodiment of the present invention, and the scope of the present invention is not limited to this. That is, the descriptions of the configuration of the above-mentioned device and the shape of each portion are only exemplary, and it is obvious that various changes and additions to these examples are possible within the scope of the present invention.

INDUSTRIAL APPLICABILITY

The object moving device according to the present invention exhibits an effect capable of efficiently and smoothly moving a holding object which a carrier plate holds when moving the holding object, and is useful as an object moving device to be used in a window regulator.

REFERENCE SIGNS LIST

1 Object moving device
13 Glass holder
20 Carrier plate
21 Main body portion
22 Slit
23 Engagement projection portion
26 First edge portion
27 Second edge portion
30 Guide rail
32 Base portion
34 First erected portion (erected portion)
35 Leading end side portion
36 Second erected portion
40 Drive section
45 Drum member
47 Drum housing
50 Direction-changing section
51 Fixed portion
60 Cable
61 Lifting cable
62 Lowering cable
70 Cutout portion
72 Opening
74 Space portion
211a, 211b Attachment portion
213, 215 End housing portion
217 Hole portion
262 First sliding surface
266 Protrusion portion
272 Second sliding surface
342 First surface
344 Second surface
51a Fastening portion
612, 622 Terminal member

The invention claimed is:

1. An object moving device, comprising:
a guide rail including a base portion which extends in a predetermined direction, and an erected portion which is erected on the base portion along an extending direction of the base portion; and
a carrier plate including a main body portion which holds a holding object, and a slit which houses the erected portion, wherein
the carrier plate is attached to the guide rail so as to move on the guide rail along the extending direction,
the erected portion includes a first surface on a first side of the guide rail facing outward in a width direction of the guide rail and a second surface on a second side of the guide rail, and the first surface and the second surface extend in the extending direction,
the slit is formed by a first edge portion which is disposed on a side of the first surface of the erected portion and a second edge portion which is disposed on a side of the second surface of the erected portion,
a cutout portion which includes an opening facing the erected portion and which is recessed in a direction away from the second edge portion is provided in the first edge portion,
the cutout portion includes a space portion which penetrates through the first edge portion in a thickness direction of the carrier plate and allows grease to be stored therein, and
the grease stored in the cutout portion is applied to the erected portion which slides in the slit when the carrier plate moves on the guide rail.

2. The object moving device according to claim 1, wherein
the cutout portion is provided in the first edge portion on a third side of the guide rail when the carrier plate is attached to the guide rail,
the main body portion is provided with a hole portion on another a fourth side of the guide rail, and
the hole portion and the cutout portion are provided at a position which enables the grease to reach the cutout portion when the grease is injected into the hole portion in a state where the carrier plate is attached to the guide rail.

3. The object moving device according to claim 1, wherein
the carrier plate includes:
a first sliding surface facing the first surface in the first edge portion; and
a second sliding surface facing the second surface in the second edge portion, wherein
the first sliding surface and the second sliding surface have a distance from the first surface and the second surface of the erected portion, the distance causing the first sliding surface and the second sliding surface to abut on the first surface and the second surface, or the distance restraining the carrier plate from rotating in a direction which is perpendicular to an axis of the guide rail.

4. The object moving device according to claim 3, wherein
   the first sliding surface includes a plurality of protrusion portions which protrude to the side of the first surface, and
   when the carrier plate moves on the guide rail, the protrusion portions of the first sliding surface slide with the first surface.

* * * * *